United States Patent [19]
Itoh

[11] Patent Number: 5,537,237
[45] Date of Patent: Jul. 16, 1996

[54] CHIRAL SMECTIC C LIQUID CRYSTAL DISPLAY WITH A CHEVRON STRUCTURE AND δ/θ EQUAL TO 0.9 TO 1.0 AT 25° C.

[75] Inventor: Nobuyuki Itoh, Nara, Japan

[73] Assignee: Sharp Kabushiki Kaisha, Osaka, Japan

[21] Appl. No.: 370,559

[22] Filed: Jan. 9, 1995

Related U.S. Application Data

[63] Continuation of Ser. No. 936,134, Aug. 27, 1992, abandoned.

[30] Foreign Application Priority Data

Aug. 29, 1991 [JP] Japan ................................. 3-218949

[51] Int. Cl.$^6$ ................................................. G02F 1/13
[52] U.S. Cl. ......................................... 359/100; 359/90
[58] Field of Search ................................. 359/100, 90

[56] References Cited

U.S. PATENT DOCUMENTS

| | | | |
|---|---|---|---|
| 4,775,225 | 10/1988 | Tsuboyama et al. | 359/100 |
| 4,932,758 | 6/1990 | Hanyu et al. | 359/100 |
| 5,005,953 | 4/1991 | Kawagishi | 359/100 |
| 5,046,822 | 9/1991 | Matusda et al. | 359/100 |
| 5,124,827 | 6/1992 | Davey | 359/100 |
| 5,138,473 | 8/1992 | Dijon et al. | 359/100 |
| 5,151,804 | 9/1992 | Verhulst et al. | 359/100 |
| 5,164,852 | 11/1992 | Konuma | 359/100 |
| 5,182,662 | 1/1993 | Mihara | 359/100 |
| 5,189,536 | 2/1993 | Hanyu et al. | 359/100 |

FOREIGN PATENT DOCUMENTS 56-107216   8/1981   Japan .

OTHER PUBLICATIONS

Clark et al, "Director and layer structure of SSFLC cells," Ferroelectrics, vol. 85(1988), pp. 467–485.

Glogarová et al, "The structure of chiral Sm C* liquid crystal in planar samples and its change in an electric field," J. Physique, vol. 45 (Jan. 1984), pp. 143–149.

(List continued on next page.)

Primary Examiner—Anita Pellman Gross
Attorney, Agent, or Firm—David G. Conlin; Kevin J. Fournier

[57] ABSTRACT

A ferroelectric liquid crystal display device includes a pair of substrates on which an electrode is selectively formed on the surface, an insulating film and an orientation film are formed thereon and uniaxial orientation processing is performed and which are arranged so that directions of their uniaxial orientation processing may be almost parallel to each other; a liquid crystal panel which is formed by injecting a liquid crystal having a chiral smectic C phase between the substrates; a driving means for switching an optical axis of the liquid crystal by selectively applying a voltage to the electrode; and a means for optically identifying the switching of the optical axis, in which the liquid crystal shows a chevron structure as a layer structure at the chiral smectic C phase in which a layer structure is doglegged, and an orientation region generated from interaction in the uniaxial orientation processing direction and the layer structure is an inside region surrounded by a lightning defect generated in the uniaxial orientation direction and a hair pin defect generated behind the lightning defect or an outside region surrounded by the hair pin defect generated in the uniaxial orientation direction and a lightning defect generated behind the hair pin defect the liquid crystal can invert to switch an orientation axis near the substrates, and a ratio of an angle δ of inclination of a layer of the liquid crystal to the normal to the substrate, to a tilt angle Θ is made to be from 0.9 to 1.

3 Claims, 7 Drawing Sheets

OTHER PUBLICATIONS

Sato et al, "Effects of AC electric field on the contrast ratio and the orientation of the ferroelectric liquid crystal", The Twelfth Liquid Crystal Meeting (Nagoya) 1F16 (1986) pp. 40–41.

Yamada et al, "Investigation of switching behavior in a ferroelectric liquid crystal aligned on obliquely deposited SiO films," Jpn. J. Appl. Phys., vol. 28, No. 1 (Jan. 1989), pp. 50–55.

Rieker et al, "'Chevron' local layer structure in surface-stabilized ferroelectric smectic–C cells", Phys. Rev. Letters, vol. 59, No. 23 (Dec. 1987), pp. 2658–2661.

Koden et al, "The States of Surface-Stabilized Ferroelectric Liquid Crystal with High–Pretilt Aligning Film," Japanese Journal of Applied Physics, vol. 30, No. 10B (Oct., 1991), pp. L1923–L1825.

C1Tw          C2Tw

C1U           C2U

CHIRAL SMECTIC C LIQUID CRYSTAL DISPLAY WITH A CHEVRON STRUCTURE AND δ/θ EQUAL TO 0.9 TO 1.0 AT 25° C.

This is a continuation of application Ser. No. 07/936,134 filed Aug. 27, 1992, now abandoned.

BACKGROUND OF THE INVENTION

1. Field of the Invention

The present invention relates to a liquid crystal display device and more particularly, to a liquid crystal display device using a ferroelectric liquid crystal.

2. Description of the Related Art

A conventional liquid crystal display device using a nematic liquid crystal comprises a twisted nematic (TN) type liquid crystal display device and a supertwisted birefringence effect (SBE) type liquid crystal display device.

In the twisted nematic type liquid crystal display device, however, as a driving method becomes multiplex, a driving margin becomes narrow, so that sufficient contrast cannot be obtained. In the supertwisted birefringence effect type liquid crystal display using a large twist angle, which is an improved display device of the twisted nematic type liquid crystal display device, when it is used in a large-capacity display device, the contrast is lowered or the response speed is decreased.

Then, in order to improve the liquid crystal display device using the nematic liquid crystal, there was proposed a liquid crystal display device using a chiral smectic C liquid crystal, that is, a ferroelectric liquid crystal by N. A. Clark and Lagerwall in 1980 (Japanese Unexamined Patent No. 107216/1981, and U.S. Pat. No. 4,367,924).

This liquid crystal display device is different from the above liquid crystal device using an electric field effect in which the dielectric anisotropy of a liquid crystal molecule is used and has a structure employing a rotating force for matching a polarity of a spontaneous polarization of the ferroelectric liquid crystal with a polarity of the electric field. This liquid crystal device has a bistable characteristic, a memory characteristic, and high-speed response characteristic. More specifically, when the ferroelectric liquid crystal is injected into a cell having a thin gap, a spiral structure of the ferroelectric liquid crystal is broken by an influence of an interface of the substrate, and then there exist together a region where the liquid crystal molecule is inclined from the normal line of the smectic layer by an angle of Θ and a region where the liquid crystal molecule is inclined in the opposite direction by −Θ, so that a bistable property is provided. The directions of the liquid crystal molecule and its spontaneous polarization can be uniformby applying a voltage to the ferroelectric liquid crystal in the cell. Therefore, by switching the polarity of the voltage to be applied, the orientation of the liquid crystal molecule can be switched from a certain constant state to another constant state.

Since birefringent light in the ferroelectric liquid crystal in the cell is changed by the switching operation, transmitted light can be controlled by sandwiching the cell between two polarizers. In addition, even if the application of the voltage is stopped, the orientation of the liquid crystal molecule is kept at a state before application of the voltage is stopped, so that the memory effect can be also obtained. A time required for driving the switching operation has a high-speed response characteristic, that is, below 1/1000 of the twisted menatic type liquid crystal display device because the spontaneous polarization of the liquid crystal and the electric field directly affect it, enabling high-speed display. Thus, by using the memory effect or the high-speed response characteristic of the ferroelectric liquid crystal, there has been implemented a liquid crystal display device of high resolution in which there are many scanning lines using a multiplex driving method.

However, there are many problems in the liquid crystal display device proposed by Clark and Lagerwall. That is, it is thought that in a first model, a layer structure of the smectic C phase has a structure perpendicular to a substrate, called bookshelf type shown in FIG. 3.

However, in a case where a cell is made by using a conventional orientation method by rubbing or the like, it has been found that a switching phenomenon and an optical characteristic is considerably different from that expected, and its switching operation is completely different from that of the proposed model.

As one reason for the above, it was analyzed using a small angle scattering method of an X-ray that the layer structure is doglegged, called a chevron structure shown in FIG. 4. [Phys. Rev. Lett., 59, pp.2658 (1987) by Rieker, T. P., Clark, N. A,]

In addition, it is also different from the first model in that the direction of the spontaneous polarization and the liquid crystal molecule have a uniform orientation and also the molecule has a twisted orientation between upper and lower substrates. [Glogarova, M. and Pavel, J., J. Phys. (France), 45, pp. 143 (1984)]

Especially, the ferroelectric liquid crystal display device oriented by rubbing has the twisted orientation because regulating force at the interface strongly acts thereon. In such orientation, it is found that a difference in an optical molecular axis in switching between two states does not generally effectively appear and high contrast characteristic is not obtained. In order to solve the above problems, there are proposed several methods to attain a layer structure model proposed by Clark et al. For example, there is one example in which an SiO oblique deposition method is used, and then the layer is prevented from being doglegged by applying a relatively high pretilt to the substrate interface to attain an oblique layer structure.

In addition, there is another method in which the layer structure is changed to the bookshelf structure by applying an alternating electric field of a high voltage to the cell having the doglegged structure [the twelfth Liquid Crystal Meeting (Nagoya) by Sato et al., 1F16 (1986)]. It has been reported that high contrast can be provided by either method.

However, in the above oblique deposition method, it is difficult to make the deposition angle uniform and there is a big problem in productivity because of vacuum processing. In addition, in the method which applies the electric field, it is difficult to uniformly change the layer structure because it gradually changes to the chevron structure with the lapse of time, so that it has not been put to practical use.

SUMMARY OF THE INVENTION

According to the present invention, a ferroelectric liquid crystal display device includes a pair of substrates on which an electrode is selectively formed on the surface, then an insulating film and an orientation film are formed thereon and uniaxial orientation processing is performed and which are arranged so that directions of their uniaxial orientation processing may be almost parallel to each other; a liquid crystal panel which is formed by injecting a liquid crystal having a chiral smectic C phase between the substrates; driving means for switching an optical axis of the liquid crystal by selectively applying a voltage to the electrode; and means for optically identifying the switching of the optical axis, in which the liquid crystal shows a chevron structure as a layer structure at the chiral smectic C phase in which a layer structure is doglegged, and an orientation region generated from interaction in the uniaxial orientation processing direction and the layer structure is an inside region surrounded by a lightning defect generated in the uniaxial orientation direction and a hair pin defect generated behind the lightning defect or an outside region surrounded by the hair pin defect generated in the uniaxial orientation direction and a lightning defect generated behind the hair pin defect, the liquid crystal can invert to switch an orientation axis near the substrates, and a ratio of an angle δ of inclination of a layer of the liquid crystal to the normal to the substrate, to a tilt angle Θ is made to be from 0.9 to 1.

In addition, according to the present invention, the uniaxial orientation processing is performed on the orientation film by the rubbing method.

DETAILED DESCRIPTION OF THE PREFERRED EMBODIMENTS

Figure 1:
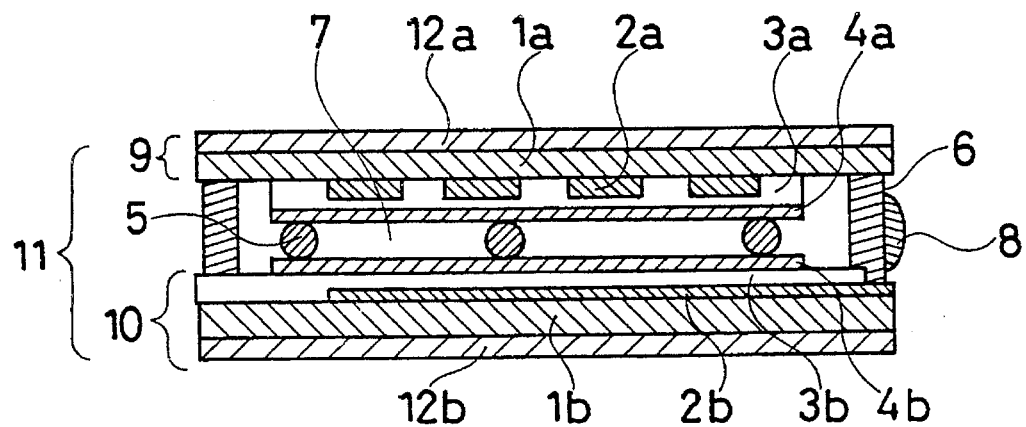
FIG. 1 is a schematic sectional view showing a liquid crystal display device according to an embodiment of the present invention.

It is an object of the present invention to provide a liquid crystal display device having a high contrast in a chevron structure.

A liquid crystal of the present invention is a liquid crystal having a chiral smectic C phase such as cyanophenyl cyclohexane type, cyanobiphenyl type, fluoride type, tolane type and so on.

The driving method of the present invention can be employed by a conventional method such that a signal is applied to the scanning electrodes and signal electrodes connected to pixels.

According to the present invention, when an optical axis of the liquid crystal is switched by the driving means, a liquid crystal molecule is inverted not only in the vicinity of the doglegged region in the chevron structure generated almost in the center of the pair of substrates but also in the vicinity of the substrates. Therefore, although the orientation of the liquid crystal molecule is a little different from each other because of the doglegged structure in the vicinity of the substrates, the liquid crystal molecule is almost uniformly oriented between the substrate and the vicinity of the interface and then it is uniform from one substrate to the border and from the border to the other substrate. As a result, the liquid crystal molecule shows the orientation which is not almost twisted.

Thus, since the liquid crystal is not almost twisted, it is possible to prevent leakage of light when the light is shielded by using with means for optically identifying the switching of the optical axis such as the polarizer, and thus the contrast characteristic can be improved.

The doglegged direction in the chevron structure in the present invention is the direction generated inside the region surrounded by the lightning defect generated in the uniaxial orientation processing direction and the hair pin defect generated behind the lightning defect or outside the region surrounded by the hair pin defect generated in the uniaxial orientation processing direction and the lightning defect generated behind the hair pin defect. Therefore, when the optical axis of the liquid crystal is switched by the driving means in the present invention, the difference between the optical molecular axes-of two states, that is, the memory angle is large. Therefore, when the optical axis of the liquid crystal is switched, since the difference in the amount of transmitted light between the state transmitting the light and the state not transmitting light can be large when using with the means, for example a polarizer, for optically identifying the switching of the optical axis, a high contrast is obtained.

According to the present invention, when a ratio δ/Θ of the angle δ of the smectic layer to the normal to the substrate to the tilt angle Θ is from 0.9 to 1, the doglegged direction of the layer can be further easily implemented by a simple rubbing method.

The present invention will be described in detail in reference to embodiments shown in the drawings. However, the present invention is not limited to the following embodiments.

Figure 2:
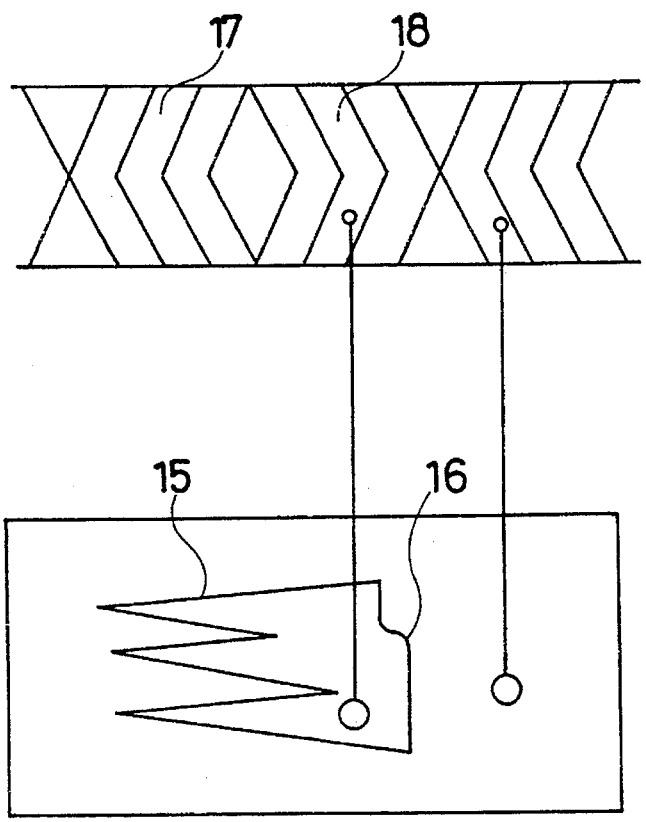
FIG. 2 is a schematic view showing a layer structure of a chiral smectic C phase according to the embodiment of the present invention.
Figure 3:
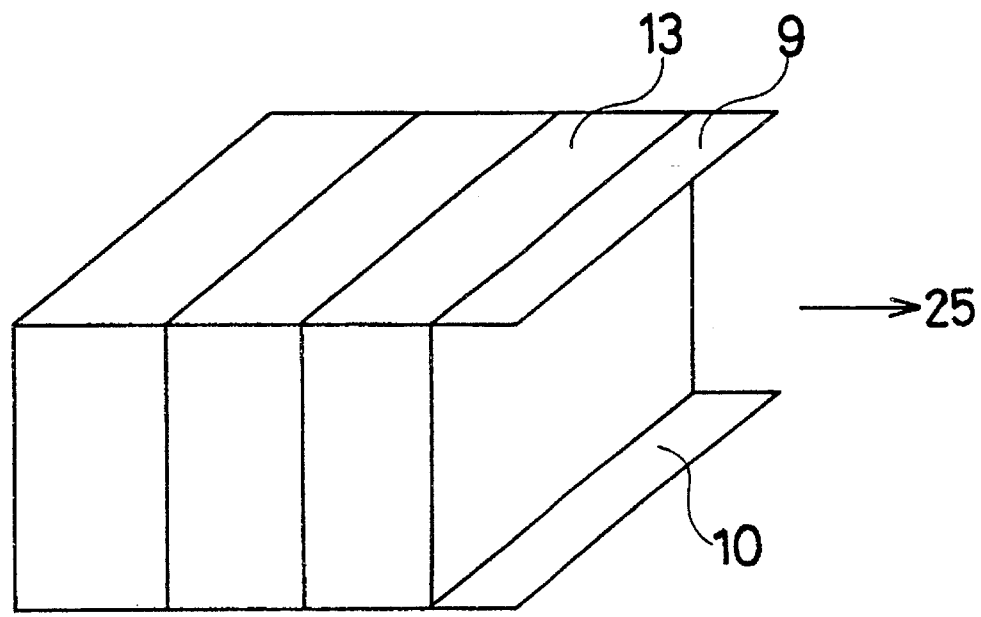
FIG. 3 is a schematic view showing a layer structure of a chiral smectic C phase in a conventional example.
Figure 4:
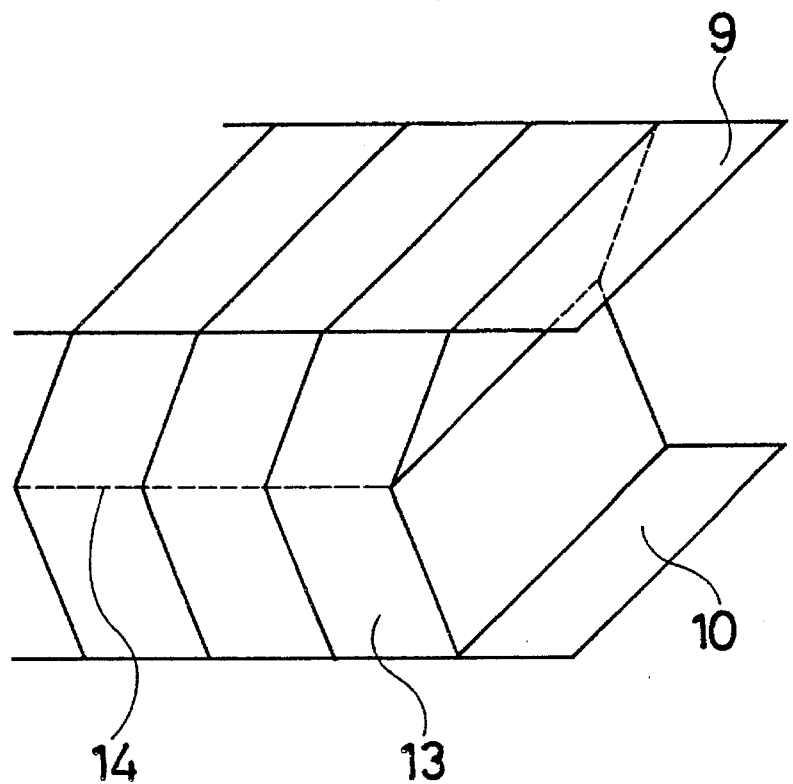
FIG. 4 is a schematic view showing a layer structure of a chiral smectic C phase.

It is known that the layer structure of the chiral smectic C phase is generally a doglegged structure. The reason for the structure is that the molecule in the vicinity of the border of the substrates is not likely to move, while the space between layers in the liquid crystal phase (generally a smectic A phase) at a temperature higher than that of the chiral smectic C phase is reduced because the liquid crystal molecule is inclined when changed to the chiral smectic C phase. It is thought that the liquid crystal molecule in the middle phase at a high temperature is extended so as to keep the space between the molecules, while the space between molecules of the liquid crystal molecule at the interfaces remained. Therefore, the space between layers of the liquid crystal molecule has be to reduced as a whole, so that the layer is doglegged. However, there are two doglegged directions 17 and 18 in the layer as shown in FIG. 2, which means there are two different orientations. Thus, an orientation defect called a zigzag defect is generated at the interface where the layers are doglegged.

As shown in FIG. 2, there are generated two kinds of defects in the zigzag defect at the doglegged part in the layer.

Judging from their configurations, one of them is called lightning defect 15 and the other is called hair pin defect 16. The doglegged directions can be estimated from their configurations. [Jpn. J. Appl. Phys., 28, pp. 50 (1988)]

According to the present invention, the above doglegged structure is employed, which will be described in detail hereinafter. When the orientation processing directions in the upper and lower substrates are the same, there are two different orientations, which depends on whether the doglegged direction is the same as the orientation processing direction or it is opposite, which is shown in FIG. 5.

Figure 5:
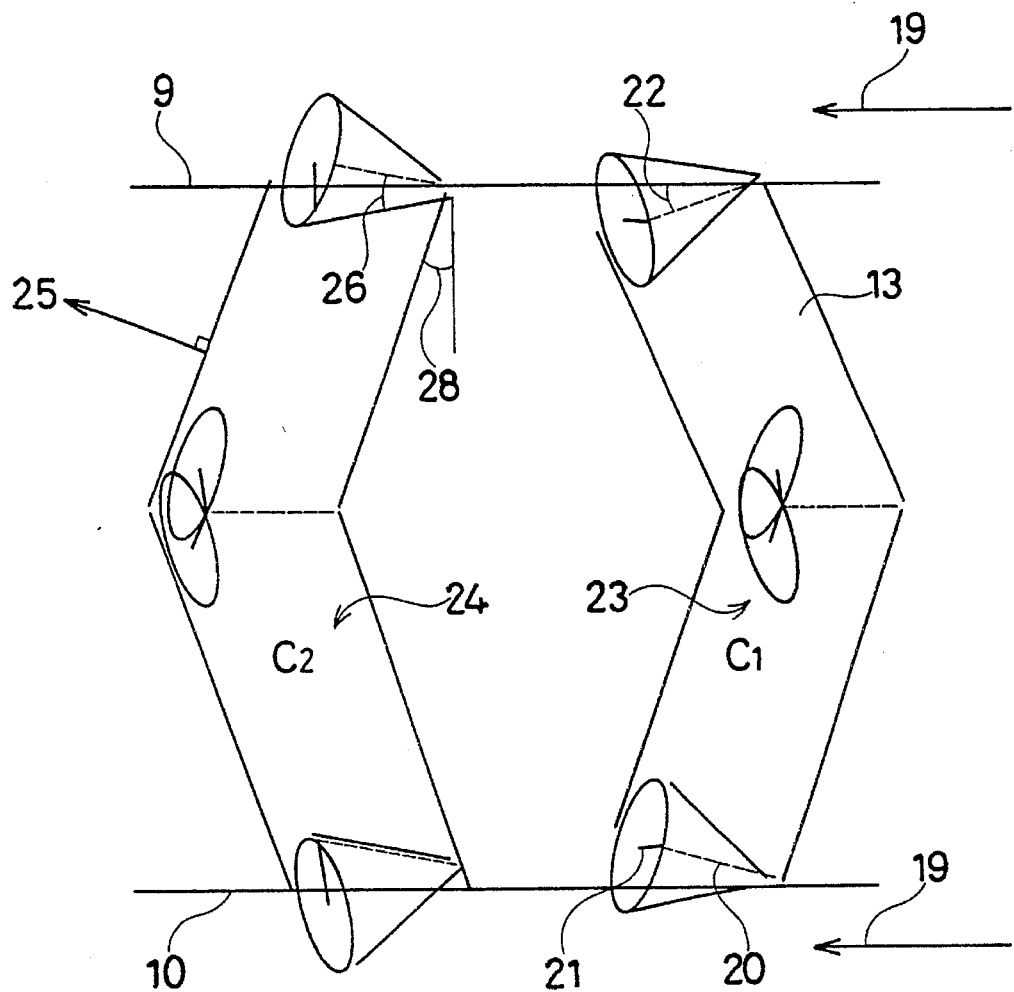
FIG. 5 is a schematic view showing C1 orientation and C2 orientation according to the embodiment of the present invention.

A cone shape shown in FIG. 5 is a raceway track on which the liquid crystal molecule can move on switching, which is inclined from the layer normal line 25 by the tilt angle 26 of the liquid crystal. An arrow 19 shows the rubbing direction. This relation is discussed in Japanese Unexamined Patent No. 158415/1989, in which a layer structure 23 shown in FIG. 5 where the rubbing direction is opposite to the doglegged direction in the layer is defined as chevron 1 (C1 orientation) and a layer structure 24 shown in FIG. 5 where the rubbing direction is the same as the doglegged direction in the layer is defined as chevron 2 (C2 orientation). The same definition is used also in this specification.

The C1 orientation and C2 orientation show almost the equivalent orientation when there is no pretilt of the liquid crystal molecule at the interface of the substrates. However, when the uniaxial orientation processing such as the rubbing processing is performed, a pretilt 22 of the liquid crystal molecule is generated in the direction shown in FIG. 6. If the pretilt is increased, the difference in the orientation of the liquid crystal molecule between the C1 and C2 becomes obvious, which is shown in FIG. 9.

Figure 9:
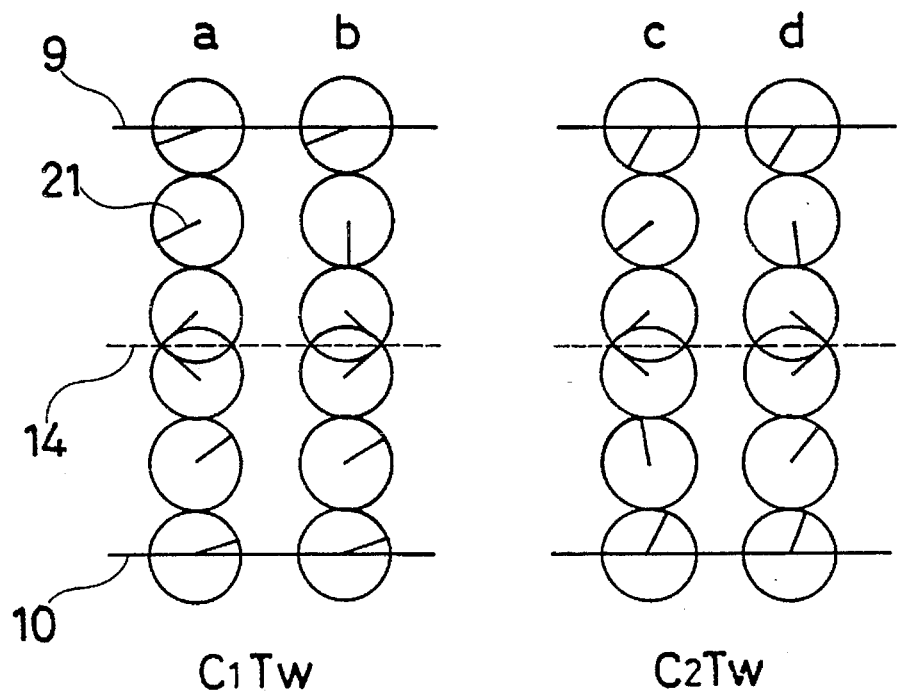
FIG. 9 is a view showing a C director of the C1 orientation and C2 orientation according to the embodiment of the present invention.
Figure 9:
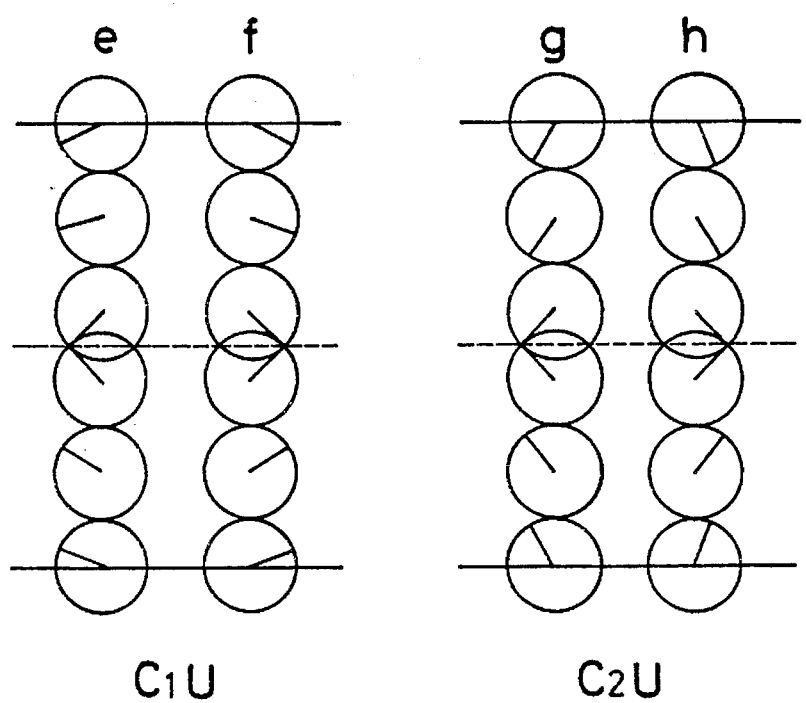

Referring to FIG. 9, a, b, c and d designate molecules of the C1 and C2 orientations when the molecules are not likely to move at the interface of the substrates, which are shown by a display method using the C director. Since the liquid crystal molecules are twisted in the upper and lower substrates, in this case, the C1 orientation and C2 orientation are defined as the C1T (C1 twist) orientation and the C2T (C2 twist) orientation, respectively. The switching when the electric field is applied occurs between a and b and between c and d. In this case, the switching of the memory state occurs only at a joint part 14 of the chevron structure.

Referring to FIG. 5, in reference to the arrangement of the molecules at the interface between the upper and lower substrates, an n director 20 is considerably twisted in the C1T orientation of a and b in FIG. 9, while it is twisted a little in the C2T orientation of c and d in FIG. 9. When the polarizing plates are arranged so as to cross at right angles at the upper and lower cells and the cell is rotated therein, there is no quenching angle in the C1T orientation and there is a quenching angle in the C2T orientation. As a result, it is found that the better contrast characteristic can be obtained in the C2T orientation than the C1T orientation. (Japanese Unexamined Patent No. 158415)

However, when the molecules in the vicinity of the interface are made easily movable and the interface invention of the molecule is generated, the conditions are different. In FIG. 9, e, f, g, and h shows a molecule of the C1 and C2 orientations in the memory state when the interface invention is generated.

Since the twist of the liquid crystal molecules is untwisted at the upper and lower substrates, the molecules are uniformly arranged. In this case, the C1 orientation and C2 orientation are defined as the C1U (C1 uniform) orientation and the C2U (C2 uniform) orientation, respectively. The switching when the electric field is applied occurs between e and f, and between g and h.

In this case, in the C1U orientation, there is no twist of the molecules at the upper and lower substrates in both memory states and an optical axis angle (memory angle θ) between the two memory states is increased. Therefore, quenching is possible in orthogonal nicol and also a large change in intensity of transmitted light can be obtained by putting a cell at a quenching position and applying a voltage thereto, because the optical angle is largely moved when the optical axis is switched to the other memory state.

However, in the C2U orientation, even if the invention of the molecule in the vicinity of the interface occurs, as can be seen from FIG. 9, the optical axis can not be largely changed between the first memory state and the second memory state. Therefore, higher contrast can be obtained in the C1U orientation.

Thus, the contrast characteristic has the following relation.

Large contrast C1U>C2U≧C2T>C1T Small contrast

According to the present invention, the C1U orientation is employed in the liquid crystal display device in view of the fact described above. How to distinguish these orientations will be described hereinafter in view of the fact described above.

Figure 6:
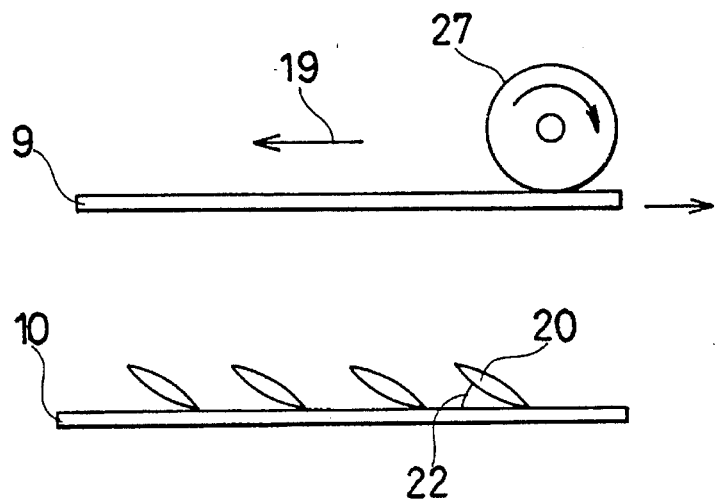
FIG. 6 is a view showing a rubbing processing according to the embodiment of the present invention.

First, how to distinguish C1 from C2 will be described. The doglegged direction of the layer can be estimated from the configuration of the zigzag defect generated from a damage in the cell or the spacer. There are two kinds of configurations in the defect, the lightning defect and the hair pin defect. Normally, these two defects are connected and it is known that the doglegged direction of the layer at a region surrounded by the defects is different from that of the outside thereof (referring to FIG. 2). Therefore, the rubbing direction and the doglegged direction of the layer can be estimated. In addition, the rubbing direction is the direction of the pretilt of the molecule, as shown in FIG. 6.

Next, it will be described how to distinguish the twisted orientation from the uniform orientation.

1. When a chopping wave of low frequency is applied to the cell, an inversion domain is observed by a microscope. At that time, the domain inversion (called a domain of a boat form) because of movement of an internal disclination generated at the joint (the doglegged part) of the chevron is generated regardless of the twisted orientation or the uniform orientation. Therefore, when one or more domain inversions except for that inversion are observed, it is determined that the inversion is the one at the interface and then it is through the uniform state at the time of switching.

2. When a ratio of the optical axis angle between two stable states (no voltage is applied) at the time of memory to the moving angle of the optical axis found by applying a sufficient electric field (approximately ±10 V) to the cell is 40% or more, it is the uniform orientation. In the twisted orientation, the value is only approximately a 30% level.

Therefore, according to the present invention, the C1U orientation in which a high contrast can be obtained is employed in the liquid crystal display device in view of the fact described above.

EXAMPLE 1

Figure 7:
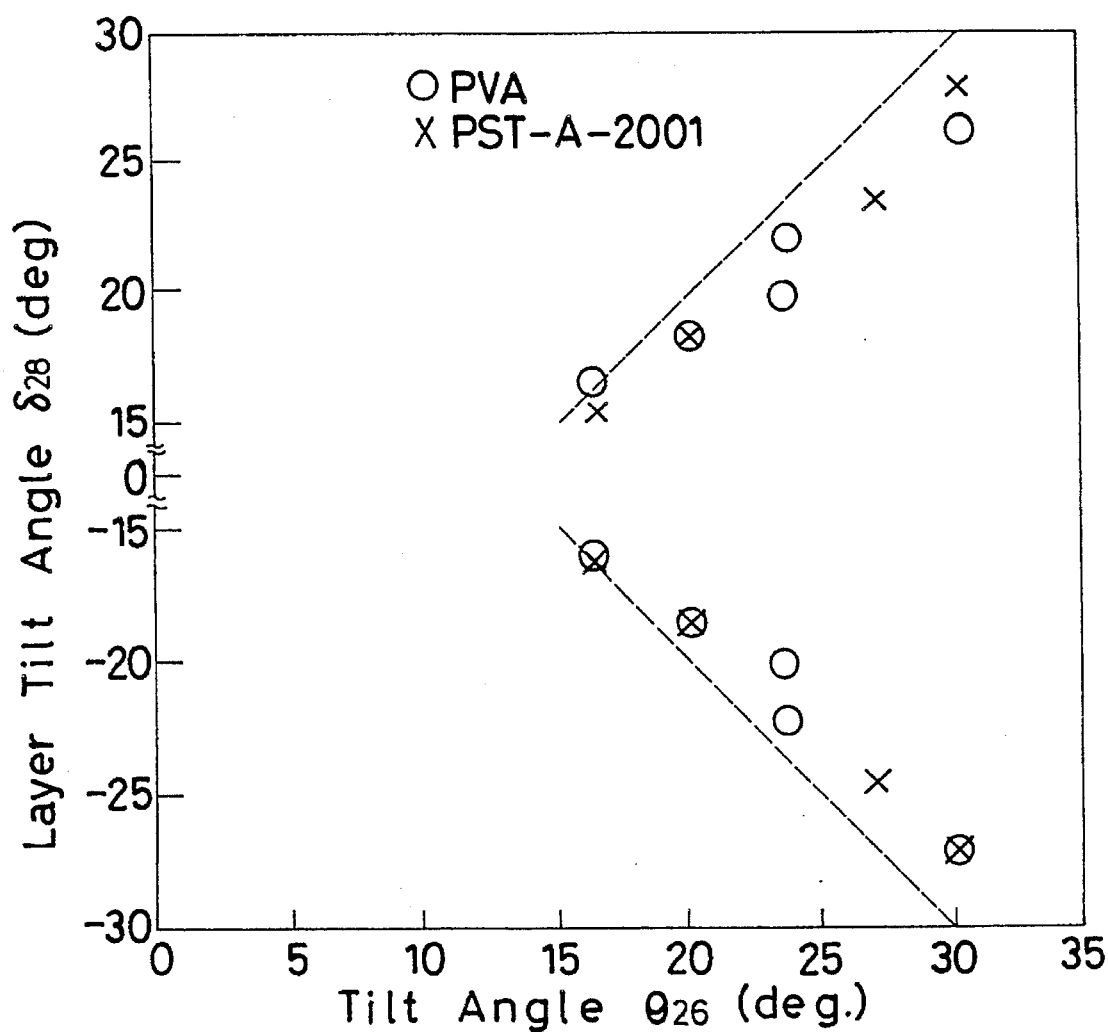
FIG. 7 is a graph showing a relation between an angle of inclination of a layer and a tilt angle of a molecule.

The angle of inclination δ of the layer of the chevron structure was measured using various liquid crystals shown in table 1 by an X-ray diffraction method, which is shown in FIG. 7.

TABLE 1

| Ferroelectric liquid crystal material | | |
|---|---|---|
| | Phase Transmission Temperature C · S$_c$ · S$_a$ · N · I | Tilt Angle (25° C.) |
| CS-1014* | −21 · 54 · 69 · 81 · | 20° |
| CS-1022* | −11 · 60 · 73 · 85 · | 24° |
| Mixture A | ·<RT · 55 · 82 · 93 · | 16° |
| ZLI-3654** | ·<RT · 62 · 76 · 86 · | 24° |
| ZLI-3489** | ·<RT · 65 · 71 · 87 · | 27° |
| FELIX-002# | −7 · 70 · 77 · 87 · | 30° |

*made by Chisso Petrochemical Co., Ltd. (Alkyl type liquid crystal)
**made by Merck & Co. (Alkyl type liquid crystal)
made by Hoechst AG (Alkyl type liquid crystal)

where the liquid crystals CS-1014 and CS-1022 are made by Chisso Petrochemical Co., Ltd and the liquid crystals ZLI-3654 and ZLI-3489 are made by Merck & Co., the liquid crystal FELIX-002 is made by Hoechst AG, and Mixture A is a liquid crystal as follows.

Composition of Mixture A $C_5H_{11}$—⟨⟩—⟨⟩—OCH$_2$—[structure]—$C_4H_9$   (I)   2%

$C_nH_{2n+1}$—[structure with N, N]—⟨⟩—OC$_m$H$_{2m+1}$   (II)   98%

Composition of Compound (II)

| n | m | |
|---|---|---|
| 7 | 7 | 5% |
| 7 | 8 | 10% |
| 7 | 9 | 15% |
| 8 | 8 | 20% |
| 8 | 10 | 30% |
| 9 | 6 | 20% |

(Ratio of composition of compound (II))

and x in the figure are data when a polyimide material (PSI-A-2001 made by Chisso Petrochemical Co., Ltd.) and polyvinyl alcohol (PVA) are used as the orientation film. It is found by Rieker et al. that the pretilt angle of both orientation films of the PSI-A-2001 is approximately 15° and that of the PVA is approximately 0.5°, which is considerably different, but the angle of inclination $\delta$ of the layer does not depend on the orientation film. [T. P. Rieker, N. A. Clark et al. Phys. Rev. lett., 59. pp.2658 (1987). However, a method for measuring the pretilt angle of the ferroelectric liquid crystal has not been established yet, so that the pretilt angle in this embodiment is a value measured for the nematic liquid crystal. The dotted lines in the figure show the relation that $\delta=\Theta$ (tilt angle). As can be seen from the figure, the angle of inclination $\delta$ is a little smaller than the tilt angle $\Theta$. Two orientation states shown in FIG. 5 are drawn from the above relation. Then, it is found that there is a difference in stability of generation of the C1 orientation and C2 orientation, depending on the relation of the angle of inclination $\delta$ 28 of the layer and the tilt angle $\Theta$ 26.

Figure 10:
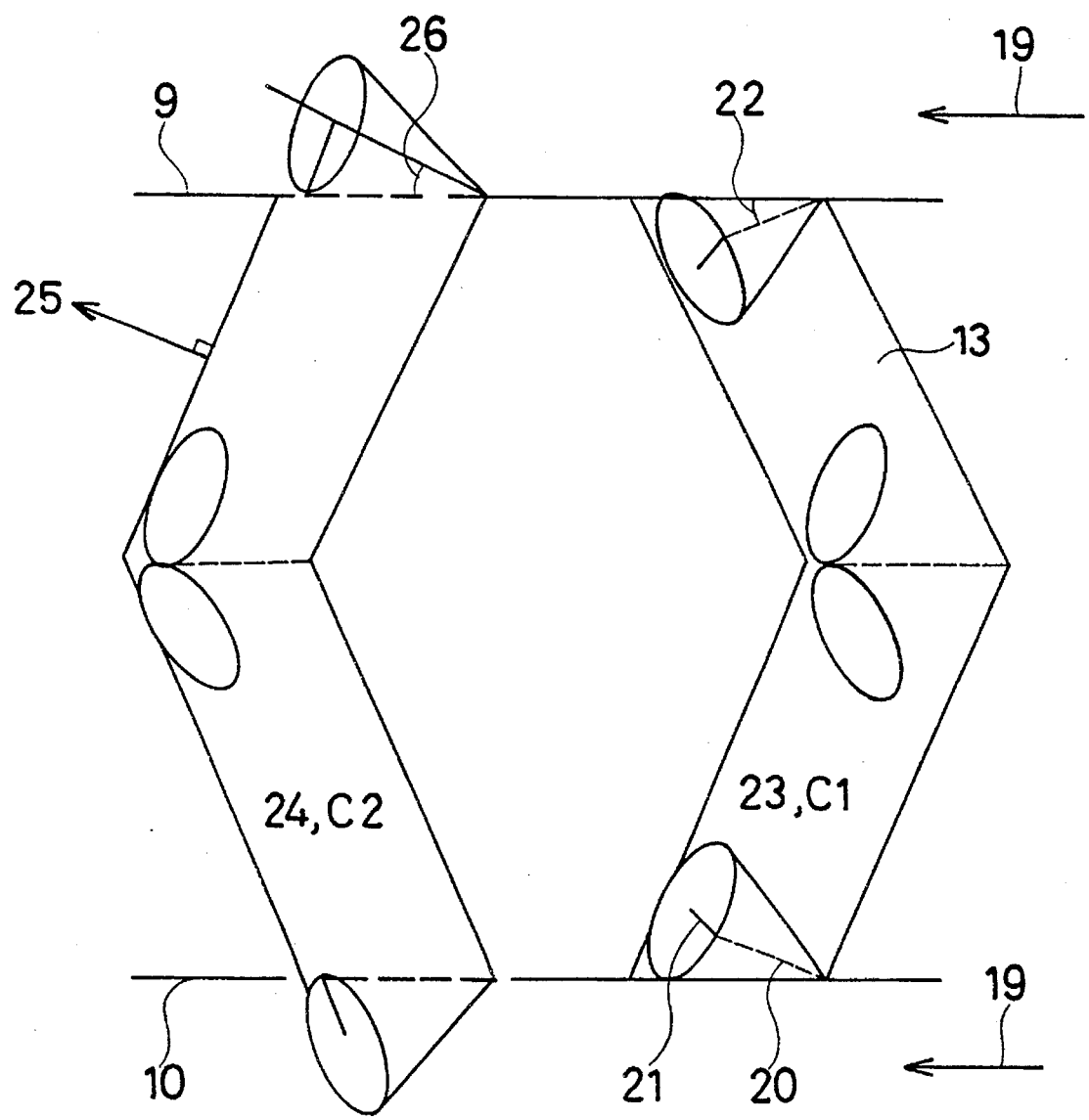
FIG. 10 is a schematic view of the C1 orientation and C2 orientation when δ=Θ.

When $\delta>\Theta$, the layer is not stable in view of energy and actually such layer has not been observed. When $\delta<<\Theta$, the C1 orientation and C2 orientation both exist in a stable manner and even if the pretilt at the interface is large to a certain degree, the C2 orientation exists. However, when $\delta=\Theta$, the C2 orientation exists only under the condition that there is no pretilt at the interface, which is shown in FIG. 10.

As described above, when the uniaxial processing is performed, the pretilt is generated. Therefore, if a material which satisfies the condition that $\delta=\Theta$ is selected, the C1 orientation can be stably provided, preventing generation of the C2 orientation. Thus, the C1 orientation can be stably obtained by another well-known means and a further high contrast characteristic can be obtained. The another means described above is a technique implementing that an interface pretilt $\Theta_P$ (angle formed between the substrate and the liquid crystal molecule)>>the tilt angle $\Theta$ (an angle when a cone angle of the liquid crystal molecule in the C1U orientation is 2$\Theta$) disclosed in Japanese Unexamined Patent No. 7879/1991 or a technique implementing the interface pretilt of 8° to 35° disclosed in Japanese Unexamined Patent No. 32395/1991.

Figure 8:
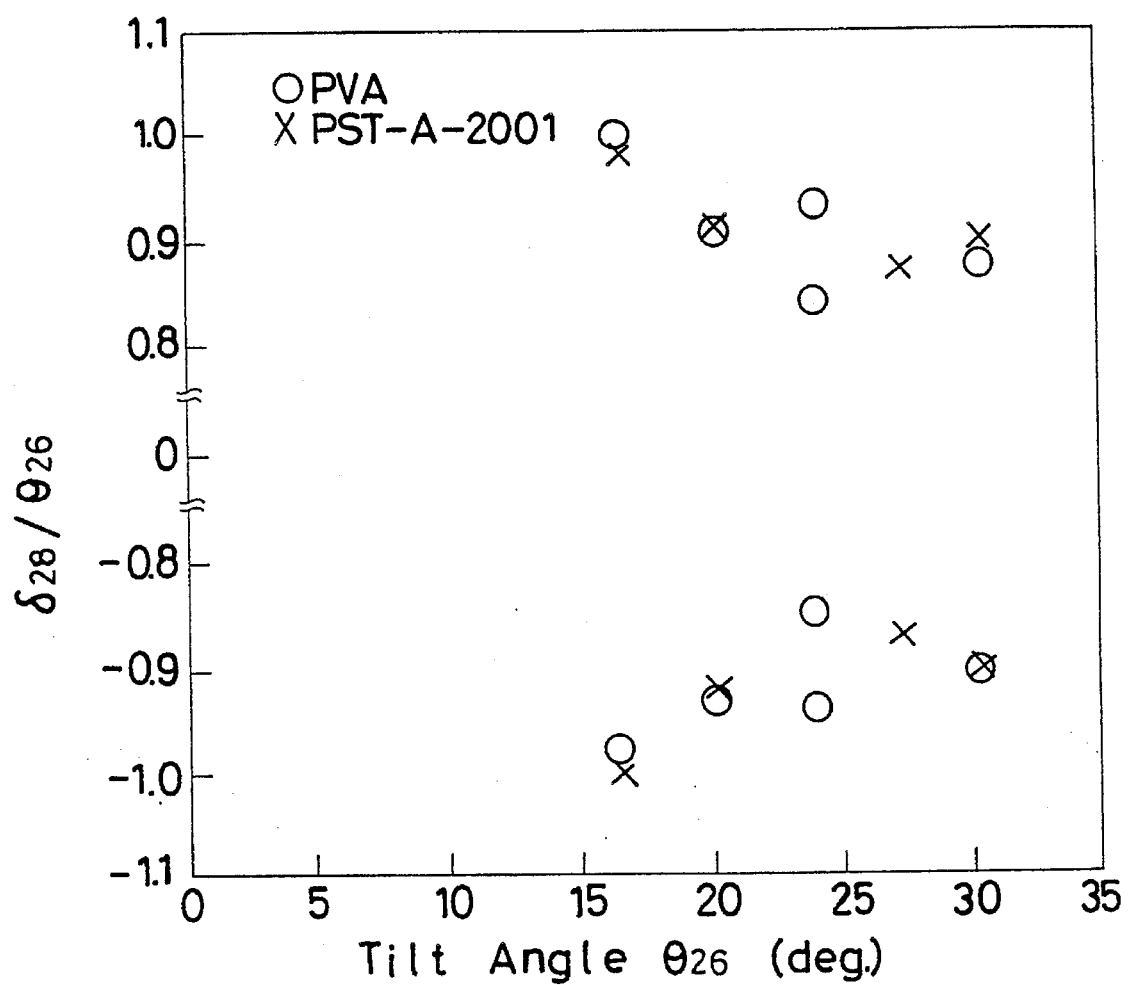
FIG. 8 is a graph showing a ratio of the angle of inclination of the layer to the tilt angle of the molecule according to the embodiment of the present invention.

FIG. 8 is a graph showing the relation between $\delta(28)>\Theta(26)$ and $\Theta(26)$ for more detail examination, where $\delta/\Theta$ is an absolute value. Actually, in a material having $\delta/\Theta$ of from 0.9 to 1, the C2 orientation does not exist and the C1 orientation can be stably obtained like in the above condition that $\delta=\Theta$.

EXAMPLE 2

A liquid crystal display device according to the present invention will be described in reference to an embodiment of the present invention.

FIG. 1 is a sectional view showing the liquid crystal display device of the present invention. Referring to FIG. 1, a plurality of transparent electrodes 2a having a thickness of 300 to 5000 Å, preferably 1000 to 3000 Å, which are arranged in the form of stripes so as to be parallel to each other, are formed on a glass substrate 1a. Then, an electrode protective film 3a formed of SiO$_2$ having a thickness 300 to 5000 A, preferably 1000 to 2000 Å is formed thereon by sputtering and then a PSI-A-2001 (polyimide) orientation film 4a made by Chisso Petrochemical Co., Ltd. is formed thereon with a thickness of 400 Å by spin coating. Thereafter, the uniaxial orientation processing is performed using rayon cloth by a rubbing method. Thus, a substrate 9 is formed.

Meanwhile, a plurality of transparent electrodes 2b are arranged in the form of stripes so as to be parallel to each other on another glass substrate 1b in the same manner and then an orientation film 4b is formed through an electrode protective film 3b under the same condition. Thereafter, the uniaxial orientation processing is performed by the rubbing method. Thus, another substrate 10 is formed.

Then, the substrates 10 and 9 are put together at a distance of 1.5 μm through a silica spacer 5 with a sealing material 6 formed of epoxy resin so that the orientation films 4a and 4b may be opposite to each other, the transparent electrodes 2a and 2b may cross at right angles, and the rubbing directions coincide with each other.

Then, a liquid crystal 7 showing a chiral smectic C phase is injected between the substrates 9 and 10 from an inlet by a vacuum injection method while the liquid crystal is heated, and then the inlet is shielded by an acrylic resin of a UV curing type. Thus, a liquid crystal cell 11 is made.

Then, polarizing plates 12a and 12b whose polarizing axes cross at right angles are arranged on the upper and lower side of the cell and one polarizing axis of the polarizing plate is made to coincide with either one of the optical axes of the liquid crystal of the cell 11. Thus, the liquid crystal display device is made.

The state of orientation is observed through experiments in the liquid crystal display device to which various liquid crystals shown in table 1 are injected.

In the device to which the CS-1014 and CS-1022 mixture A is injected, the C1U orientation is seen from a transition point ($T_{AC}$) from the smectic A phase to the smectic C phase, to the vicinity of the room temperature (25° C.), which is confirmed by the above described method.

In the device to which ZLI-3654, ZLI-3489, and FELIX-002 are injected, the C1U orientation and C2U orientation exist together from $T_{AC}$ to the vicinity of the room temperature.

In a liquid crystal display device having the orientation film of PVA of the above structure, the state of orientation is observed.

In the device to which CS-1014 and CS-1022 mixture A is injected, the C1T orientation is seen from $T_{AC}$ to the vicinity of the room temperature (25° C.).

In the device to which ZLI-3654, ZLI-3489 and FELIX-002 are injected, the C1U orientation and C2 orientation exist together from TAC to the vicinity of the room temperature.

The above results are shown in table 2.

TABLE 2

| Liquid Crystal Material (δ/Θ) | Orientation Film | Orientation |
|---|---|---|
| CS-1014 (0.918) | PSI-A-2001 | C1U |
|  | PVA | C1T |
| Mixture A (0.982) | PSI-A-2001 | C1U |
|  | PVA | C1T |
| CS-1022 (0.936) | PSI-A-2001 | C1U |
|  | PVA | C1T |
| ZLI-3654 (0.845) | PSI-A-2001 | C1U, C2 |
|  | PVA | C1T, C2 |
| ZLI-3489 (0.872) | PSI-A-2001 | C1U, C2 |
|  | PVA | C1T, C2 |
| FELIX-002 (0.892) | PSI-A-2001 | C1U, C2 |
|  | PVA | C1T, C2 |

As can be obvious from the above table, because of a difference in pretilt of the orientation film, whether the C1 orientation stably exists or a possibility of generation of the C2 orientation is high is determined by δ/Θ.

According to the display device of the present invention, the C2 orientation can be prevented from being generated and the C1 orientation can be stably obtained. Furthermore, the C1U orientation can be stably obtained by another well-known means and a further high contrast characteristic (40 or more) can be attained.

While only certain presently preferred embodiments have been described in detail, as will be apparent with those skilled in the art, certain changes and modifications can be made without departing from the scope of the invention as defined by the following claims.

What is claimed is:

1. A ferroelectric liquid crystal display device comprising:

a liquid crystal panel comprising (a) a pair of substrates on each of which an electrode being selectively formed on the inside surface, (b) an insulating film and an orientation film respectively are formed over each of the electrodes and uniaxial orientation processing is performed, the substrates being arranged so that directions of their uniaxial orientation processing may be almost parallel to each other, and (c) a liquid crystal having a chiral smectic C phase injected between said substrates;

driving means for switching an optical axis of the liquid crystal by selectively applying a voltage to said electrode; and means for optically identifying the switching of the optical axis, in which the liquid crystal shows a chevron structure as a layer structure at the chiral smectic C phase and a ratio of an angle δ of inclination of a layer of the liquid crystal to the normal to the substrate, to a tilt angle θ is made to be from 0.9 to 1 at 25° C.

2. A liquid crystal display device according to claim 1, wherein said ratio is made to be from 0.95 to 1.

3. A liquid crystal display device according to claim 1, wherein said uniaxial orientation processing is performed on said orientation film by a rubbing method.

* * * * *